June 11, 1968  E. H. MORRIS ETAL  3,387,626
LIQUID SUPPLY SYSTEM
Filed July 11, 1966

INVENTORS
EDWARD H. MORRIS
BY HUMPHREY C.E. NIGHTINGALE
Christensen, Sanborn + Matthews
ATTORNEYS

United States Patent Office 3,387,626
Patented June 11, 1968

3,387,626
LIQUID SUPPLY SYSTEM
Edward H. Morris and Humphrey C. E. Nightingale,
Gloucester, England, assignors to Dowty Rotol
Limited, Gloucester, England, a British company
Filed July 11, 1966, Ser. No. 564,053
Claims priority, application Great Britain, July 22, 1965,
31,286
6 Claims. (Cl. 137—563)

ABSTRACT OF THE DISCLOSURE

An improvement is disclosed for a liquid supply system of the type comprising a pair of conjointly rotatable, motor-driven metering devices each having a source of liquid connected to the inlet thereof, and means for delivering the discharge from each device to a point of usage. The improvement assures that neither metering device in the system can run dry, when the supply of liquid to it is discontinued for some reason, while the devices are in operation. According to the invention, this result is achieved by passing a valve-controlled conduit around the devices that interconnects the inlet of one of the devices with a point in the delivery means downstream of the other metering device; and employing means in conjunction therewith that are responsive to a normal range of pressures at the aforesaid point, to close the valve when both devices are delivering liquid, but responsive to a pressure above this range at the aforesaid point, to open the valve, so that liquid is fed back to the inlet of the one metering device, when only the other device is delivering liquid.

Figure 1:
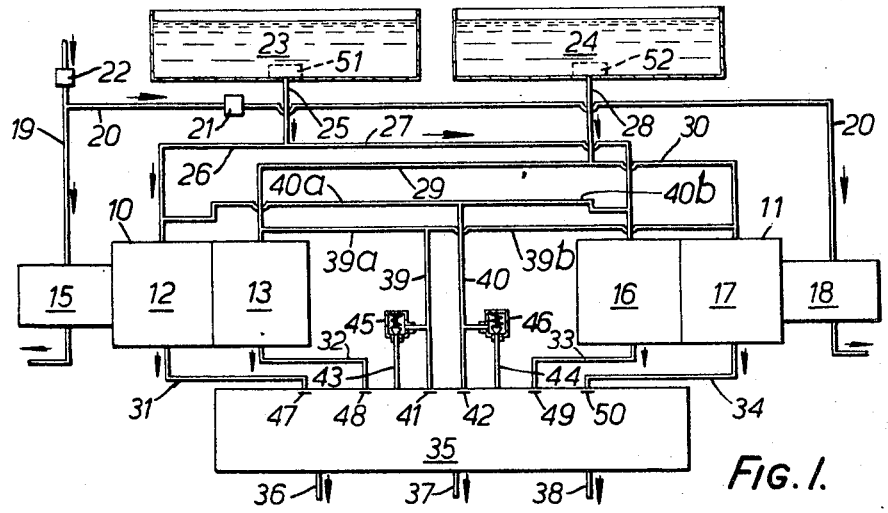

This invention relates to flow proportioning apparatus.

According to this invention a flow proportioning apparatus includes at least two metering devices, each connectible to receive liquid from a respective tank and to direct the liquid in predetermined proportion in relation to the other device or devices into a collector manifold from which all the liquid can pass to a point or points of usage, and means being provided for bleeding liquid back from a point or points downstream of the metering devices to the inlet of any metering device in the event of that metering device otherwise running dry due to failure of liquid to reach it.

The metering devices may be motor-driven and the said liquid which is bled back may be taken from the collector manifold. The metering devices may be arranged in at least two banks, each bank having a respective motor for driving the metering devices in that bank and each metering device in one bank being connected to receive its liquid from the same tank as a corresponding metering device in the other or each other bank.

The said means for bleeding liquid back may be connected to the inlets of corresponding metering devices in each of the banks.

Each motor may be of rotary hydraulic type mechanically connected to rotate the rotors of the respective metering devices. Where more than one motor is provided they receive hydraulic liquid under pressure for their operation from a common supply.

The metering devices may each be of the sliding-vane type and may each have a by-pass valve provided in a by-pass passageway between the inlet and the outlet thereof to afford safety means in the event of seizure of the rotor of the device or of the driving motor.

The by-pass passageways may be taken directly to the collector manifold.

The means for bleeding liquid back to the inlet of any metering device may include blow-off valves, one in association with each by-pass passageway, each blow-off valve being provided in a branch passageway taken from the collector manifold to a point in the respective by-pass passageway on that side of the associated by-pass valve remote from the collector manifold.

Where corresponding metering devices in the banks are starved of liquid, the pressure drop across them will be greater than that across the others which are operating normally. This is so because the same torque is applied to the dry and wet metering devices of each bank by the respective motor as is applied when both or all the devices in the bank are running normally, and consequently a higher pressure is produced in the collector manifold. This higher pressure will cause the blow-off valve in the associated branch passageway to open so that liquid is then able to bleed back to the inlets of the dry metering devices to ensure adequate lubrication of the moving components of these devices.

The flow proportioning apparatus may be a fuel flow proportioning apparatus for an aircraft where, in order to maintain desired trim of the aircraft, fuel is drawn in a predetermined proportional manner from a number of tanks and discharged into a common collector manifold which can supply fuel not only for normal operation of the engine or engines of the aircraft, but also for the operation of thrust-augmenting means, for example reheat or plenum chamber burning.

In this case the metering devices in a first bank may supply fuel to the collector manifold at a rate suitable for normal engine operation, while the metering devices in a second bank may supply fuel to the collector manifold at a rate suitable for the operation of the thrust-augmenting means as well. Since the two banks have their own driving motors, when thrust-augmentation is not required only one of the motors is required to be operative.

Control means, sensitive to engine operation or interconnected with the power plant control system, may be provided, which means are operable automatically to bring the second bank of metering devices into and out of operation.

Also, according to this invention, a flow proportioning apparatus comprises a plurality of metering devices, each connectible to receive liquid from a respective tank and to direct the liquid in predetermined proportion in relation to the other devices into a collector manifold from which all the liquid can pass to a point or points of usage, the metering devices being arranged in at least two banks, each bank having a respective motor for driving the metering devices in that bank, and each metering device in one bank being connected to receive its liquid from the same bank as a corresponding metering device in the other or each other bank.

Figure 2:
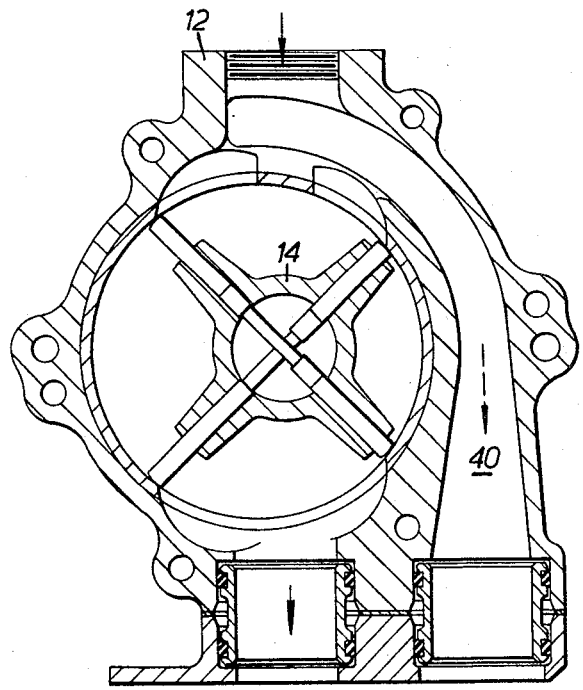

One embodiment of the invention will now be particularly described by way of example with reference to the accompanying diagrammatic drawings, of which, FIGURE 1 shows a fuel flow proportioning system for an aircraft, and, FIGURE 2 shows in cross-section a metering device for use in the system shown in FIGURE 1.

Referring to the drawings, a fuel flow proportioning system for an aircraft comprises two banks 10 and 11 of metering devices. The metering devices 12 and 13 of the bank 10 have rotors 14 of the sliding-vane type which are driven by an hydraulic motor 15. The metering devices 16 and 17 of the bank 11 have rotors also the sliding-vane type which are driven by an hydraulic motor 18.

The hydraulic motors 15 and 18, which are of axial-piston swash-plate type, are supplied with high pressure hydraulic fluid from a common source through lines 19 and 20, a control valve 21 being provided in the line 20 to control the motor 18 independently of the motor 15.

A control valve 22 is provided in the line 19 upstream of the point from which the line 20 branches.

Two fuel tanks 23 and 24 are provided, one in each wing of the aircraft. Only two tanks are shown for simplicity, but in practice more than two such tanks may be provided, some in the wings as well as in the fuselage.

A fuel line 25 taken from the tank 23 branches into lines 26 and 27 which respectively connect with the metering device 12 in the bank 10 and the metering device 16 in the bank 11. A fuel line 28 taken from the tank 24 branches into two lines 29 and 30 which respectively connect with the metering device 13 in the bank 10 and the metering device 17 in the bank 11.

Fuel lines 31, 32, 33 and 34 are respectively taken from the outlets of the metering devices 12, 13, 16 and 17, all connecting into a common collector manifold 35. A main supply duct 36 is taken from the collector manifold to the fuel system associated with the combustion chambers of a gas turbine engine, while a further fuel duct 37 is taken from the collector manifold to a fuel system also associated with the engine for the control of thrust augmentation by plenum chamber burning. A further duct 38 is connected with the collector manifold, this being intended for de-fuelling.

A T-shaped by-pass passageway 39, 39a, 39b, is provided for the metering devices 13 and 17, being taken directly from the lines 29, 30 to the collector tank 35. Similarly, a T-shaped by-pass passageway 40, 40a, 40b, for the metering devices 12 and 16 is taken directly from the lines 26, 27 to the collector manifold 35. By-pass valves 41 and 42 are provided in the passageways 39 and 40 respectively, immediately adjacent the collector manifold 35.

A bleed passageway 43 is taken from the collector manifold to the by-pass passageway 39 connecting therewith at a point upstream of the by-pass valve 41. Similarly, a bleed passageway 44 is taken from the collector manifold to the by-pass passageway 40 connecting therewith at a point upstream of the by-pass valve 42.

Both of the bleed passageways 43 and 44 respectively incorporate a blow-off valve 45, 46, and lines 31, 32, 33, 34 have one-way valves 47, 48, 49, 50.

In operation of the fuel flow proportioning apparatus, when engine operation with the normal fuel system, and without thrust-augmentation, is required, the valve 21 is closed and the valve 22 is open so that only the motor 15 is operated and thus only the metering devices 12 and 13 pump fuel into the collector manifold 35 from the wing tanks 23 and 24. Such passing of fuel is in desired proportion in accordance with the relative capacities of the two metering devices 12 and 13. If seizure of the motor 15 or of the metering devices 12 or 13 occurs, fuel can pass through the by-pass passageways 39, 39a, 39b, or 40, 40a, 40b, into the collector manifold so that fuel starvation to the engine does not occur. If for example a rupture occurs in the line 25 to the metering device 12, or if tank 23 becomes empty before tank 24, or is punctured, the blow-off valve 46 opens. This occurs because the same torque is applied now to the single pumping metering device 13 by the motor 15 as is applied when both devices are running normally and consequently a higher pressure is produced in the collector manifold 35. This higher pressure opens the blow-off valve 46 because a lower pressure exists in the by-pass passageway 40 than in the passageway 44, and a bleed of fuel passes from the collector manifold 35 through the passageway 44 into the by-pass passageway 40, 40a, and then into the line 26 and to the inlet of the metering device 12. This fuel bleed is adequate to lubricate the moving parts of the metering device 12 which are of course still being driven by the hydraulic motor 15. The lubrication afforded is adequate to prevent seizure of the metering device.

In the event of a rupture in the line 28 or if the tank 24 becomes empty before the tank 23, or is punctured, such that the inlet to the metering device 13 becomes dry, then the blow-off valve 45 will open, due to increased collector manifold pressure to permit a bleed of fuel to pass from the collector manifold through the passageway 43, by-pass passageway 39, 39a and line 29 to the inlet of the metering device 13 to afford adequate lubrication.

When it is desired to bring the thrust-augmentation into operation to supplement the engine power by plenum chamber burning, the control valve 21 is opened and the hydraulic motor 18 commences to operate. Hence the metering devices 16 and 17 also draw fuel from the tanks 23 and 24, and the collector manifold 35 receives fuel at a much higher rate so that adequate fuel can pass through the lines 36 and 37 for full augmented engine operation.

If either one or other of the metering devices 16 or 17 seizes, the by-pass passageways 39, 39a, 39b, and 40, 40a, 40b, are operable as before.

Again, if, due to a rupture in the tanks 23 or 24 or in the lines 25 or 28, either the inlets of the devices 12, 16 or the inlets of the devices 13, 17 become dry, one or other of the blow-off valves 45, 46 opens, as the case may be, to permit a bleed of fuel back from the collector manifold 35 to occur, this bleed passing to both devices 12, 16, or both devices 13, 17 to ensure that their movable components are adequately lubricated during the continued normal running of the other metering devices.

Where the aircraft is capable of landing vertically and thus where for landing and for a short period of time the fuel flow to the engine is increased for vertical landing, but with two of the metering devices running without fuel due to fuel loss, the pressure rise across the metering devices operating normally decreases rapidly and the blow-off valves 45, 46, otherwise affording the bleed, close. However for the short period of operation entailed it is adequate to rely on the residual fuel present in the dry metering devices to effect lubrication for the short period.

Suitable means in association with the engine may be provided and so interconnected with the control valve 21 as to bring the second hydraulic motor 18 into operation automatically upon initiation of the plenum chamber burning. Such means may also be provided automatically to bring in the second hydraulic motor when other forms of thrust augmentation are provided for the engine or engines associated with the fuel flow proportioning system.

The invention is in no way limited to its application to engines having provision for plenum chamber burning or re-heat, as in other embodiments it is applied to engine installatons where as well as one or more conventional engines for forward flight, a number of lift engines for vertical take-off are provided. In this case the driving motor of the second proportioner would be brought into operation automatically with starting of the lift engines.

Although in the embodiment described with reference to the drawing only two metering devices are provided in each of the two banks, in other embodiments of the invention the two banks may each have any number of metering devices depending upon the number of tanks in the aircraft from which fuel is required to be drawn in predetermined proportion, but always each tank will have an associated metering device in both proportioner banks.

Again, in other embodiments the tanks may themselves be provided with boost pumps as indicated in dotted detail at 51 or 52 in FIGURE 1 so that fuel delivered to the metering devices has a base pressure, these pumps being of variable-delivery and being automatically controlled by sensing means positioned in the collector manifold so that the base pressure is regulated in accordance with the demands of the collector manifold and the associated engine or engines.

We claim:

1. In a liquid supply system of the type comprising a pair of conjointly rotatable, motor-driven metering devices each having a source of liquid connected to the inlet thereof, and means for delivering the discharge from each device to a point of usage, the improvement wherein there is a by-pass conduit around the devices that interconnects the inlet of one of the devices with a point in the delivery means downstream of the other device, a valve in the conduit for controlling flow therethrough, and means responsive to a normal range of pressures at the aforesaid point, to close the valve when both devices are delivering liquid, but responsive to a pressure above said range at the aforesaid point, to open the valve, so that liquid is fed back to the inlet of the one metering device, when only the other device is delivering liquid.

2. The liquid supply system according to claim 1 wherein the metering devices have separate sources of liquid connected to the inlets thereof.

3. The liquid supply system according to claim 1 wherein the delivery means includes a manifold for collecting and directing the combined discharges from the devices to a point of common usage, and the conduit interconnects the inlet of the one device with a point in the manifold.

4. The liquid supply system according to claim 3 wherein there is a separate by-pass conduit interconnecting the inlet of each device with a point in the manifold, a valve in each conduit, and means responsive to a normal range of pressures in the manifold, to close the valves when both devices are delivering liquid, but responsive to a pressure above said range in the manifold, to open one of the valves, so that liquid is fed back to the inlet of the metering device corresponding thereto, when only the other device is delivering liquid.

5. The liquid supply system according to claim 1 wherein the metering devices are of the sliding vane type.

6. The liquid supply system according to claim 1 further comprising means for supplying the liquid under pressure to the inlets of the devices.

References Cited
UNITED STATES PATENTS

| | | | |
|---|---|---|---|
| 2,932,309 | 4/1960 | Godden et al. | 137—567 XR |
| 2,970,641 | 2/1961 | Rosen et al. | 103—11 XR |

JULIUS E. WEST, *Primary Examiner.*